US012649388B2

(12) United States Patent
Okada

(10) Patent No.: US 12,649,388 B2
(45) Date of Patent: Jun. 9, 2026

(54) MOTOR CONTROL SYSTEM TO BE APPLIED TO ELECTRIC VEHICLE, AND ELECTRIC VEHICLE

(71) Applicant: SUBARU CORPORATION, Tokyo (JP)

(72) Inventor: Tomoyuki Okada, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 151 days.

(21) Appl. No.: 18/738,209

(22) Filed: Jun. 10, 2024

(65) Prior Publication Data

US 2024/0326654 A1 Oct. 3, 2024

Related U.S. Application Data

(63) Continuation of application No. PCT/JP2022/042528, filed on Nov. 16, 2022.

(51) Int. Cl.
*B60L 58/27* (2019.01)
*B60L 58/26* (2019.01)
*B60K 1/00* (2006.01)

(52) U.S. Cl.
CPC .............. *B60L 58/27* (2019.02); *B60L 58/26* (2019.02); *B60K 2001/005* (2013.01);
(Continued)

(58) Field of Classification Search
CPC .... B60L 58/27; B60L 58/26; B60L 2240/425; B60L 2240/545; B60K 2001/005; B60K 2001/006
See application file for complete search history.

(56) References Cited

U.S. PATENT DOCUMENTS

| 4,538,100 A | * | 8/1985 | Tuten | ...................... H02P 23/07 |
| | | | | 318/803 |
| 5,818,116 A | * | 10/1998 | Nakae | .................... B60K 6/445 |
| | | | | 903/903 |

(Continued)

FOREIGN PATENT DOCUMENTS

| JP | H06-24238 A | 2/1994 |
| JP | 2014-7780 A | 1/2014 |
| WO | 2020/079983 A1 | 4/2020 |

OTHER PUBLICATIONS

International Search Report received in PCT Application No. PCT/JP2022/042528, dated Feb. 7, 2023, w/ English Translation.

*Primary Examiner* — Gertrude Arthur Jeanglaude
(74) *Attorney, Agent, or Firm* — Rimon P.C.

(57) ABSTRACT

A motor control system to be applied to an electric vehicle includes a battery, a motor including a rotor and a stator, two inverter circuits, one or more processors, and a cooling water circuit including a cooling water pump. The motor control system includes motors each being the motor and pairs of two inverter circuits each being the two inverter circuits. The stator of each of the motors is coupled to the two inverter circuits of a corresponding one of the pairs of two inverter circuits. The one or more processors drive the cooling water pump to circulate cooling water, and drive each of the two inverter circuits to apply oppositely directed rotational torques to the rotor, to warm up the battery. While warming up the battery, the one or more processors switch, at predetermined timing, which of the motors to allow to generate heat.

12 Claims, 7 Drawing Sheets

(52) U.S. Cl.
CPC ... *B60K 2001/006* (2013.01); *B60L 2240/425*
(2013.01); *B60L 2240/545* (2013.01)

(56) References Cited

U.S. PATENT DOCUMENTS

| | | | |
|---|---|---|---|
| 7,952,317 B2 * | 5/2011 | Suh | H03K 17/162 |
| | | | 363/40 |
| 9,284,935 B2 * | 3/2016 | Kamachi | B60L 53/62 |
| 10,396,631 B2 * | 8/2019 | Herb | H02K 5/203 |
| 10,536,058 B2 * | 1/2020 | Kim | H02P 23/00 |
| 11,958,590 B2 * | 4/2024 | Schreiber | B60L 58/12 |
| 2008/0067960 A1 * | 3/2008 | Maeda | B62D 5/046 |
| | | | 180/443 |
| 2016/0211767 A1 * | 7/2016 | Hotta | H02P 29/032 |
| 2021/0362608 A1 | 11/2021 | Kume et al. | |

* cited by examiner

WARM-UP PROCESSING
BEFORE START OF TRAVEL

FIRST
MOTOR TEMPERATURE
≤ Tm1_thr?     S31 yes ↓          no →

COUNTER-TORQUE DRIVE
FIRST MOTOR TO BRING
OUTPUT TORQUE OF FIRST
MOTOR TO ZERO     S33

SECOND
MOTOR TEMPERATURE
≤ Tm2_thr?     S35     no yes ↓

COUNTER-TORQUE DRIVE
SECOND MOTOR TO BRING
OUTPUT TORQUE OF
SECOND MOTOR TO ZERO     S37

RETURN

Pr4_m2

Pr1_m1        Pr2_m2        Pr3_m1

Tm_thr

TEMPERATURE (°C)

Tm1

Tm2

TIME (MINUTE)

MOTOR CONTROL SYSTEM TO BE APPLIED TO ELECTRIC VEHICLE, AND ELECTRIC VEHICLE

CROSS-REFERENCE TO RELATED APPLICATIONS

This application is continuation of International Application No. PCT/JP2022/042528, filed on Nov. 16, 2022, the entire contents of which are hereby incorporated by reference.

BACKGROUND

The disclosure relates to a motor control system to be applied to an electric vehicle, and an electric vehicle.

Electric vehicles include driving motors as vehicle driving sources, and a battery. A battery mounted on such electric vehicles is known to decline in charge and discharge performance in low-temperature environment such as a cold district. Thus, a battery warm-up process is carried out with a device that heats the battery.

For example, Japanese Unexamined Patent Application Publication (JP-A) No. H06-24238 describes a battery temperature control device. The battery temperature control device includes a motor, a battery, a heat generation member, a radiator, a heater core, a battery temperature detection sensor, and a control circuit. The motor allows a vehicle to travel. The battery supplies electric power to the motor. An optimal operation temperature of the battery is about a normal temperature. The heat generation member generates heat by a start-up of the vehicle. The radiator dissipates heat generated by the battery to outside the vehicle. The heater core dissipates heat generated by the battery to inside the vehicle. The battery temperature detection sensor detects a temperature of the battery. When the temperature of the battery is lower than an appropriate range, the control circuit heats the battery with heat generated by the heat generation member.

SUMMARY

An aspect of the disclosure provides a motor control system to be applied to an electric vehicle. The motor control system includes a battery, a motor, two inverter circuits, one or more processors, and a cooling water circuit. The motor includes a rotor and a stator. The two inverter circuits are coupled to the stator of the motor and configured to control driving and regeneration of the motor. The one or more processors are configured to control driving of the two inverter circuits. The cooling water circuit includes a cooling water pump and is configured to circulate cooling water through at least the battery and the motor. The motor control system includes motors each being the motor and pairs of two inverter circuits each being the two inverter circuits. The stator of each of the motors is coupled to the two inverter circuits of a corresponding one of the pairs of two inverter circuits. The one or more processors are configured to drive the cooling water pump to circulate cooling water, and drive each of the two inverter circuits to apply oppositely directed rotational torques to the rotor, to warm up the battery with cooling water heated by heat generation of the motors. The one or more processors are configured to, while warming up the battery, switch, at predetermined timing, which of the motors to allow to generate heat.

An aspect of the disclosure provides an electric vehicle including a motor control system. The motor control system includes a battery, a motor, two inverter circuits, one or more processors, and a cooling water circuit. The motor includes a rotor and a stator. The two inverter circuits are coupled to the stator of the motor and configured to control driving and regeneration of the motor. The one or more processors are configured to control driving of the two inverter circuits. The cooling water circuit includes a cooling water pump and is configured to circulate cooling water through at least the battery and the motor. The motor control system includes motors each being the motor and pairs of two inverter circuits each being the two inverter circuits. The stator of each of the motors is coupled to the two inverter circuits of a corresponding one of the pairs of two inverter circuits. The one or more processors are configured to drive the cooling water pump to circulate cooling water, and drive each of the two inverter circuits to apply oppositely directed rotational torques to the rotor, to warm up the battery with cooling water heated by heat generation of the motors. The one or more processors are configured to, while warming up the battery, the one or more processors are configured to switch, at predetermined timing, which of the motors to allow to generate heat.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
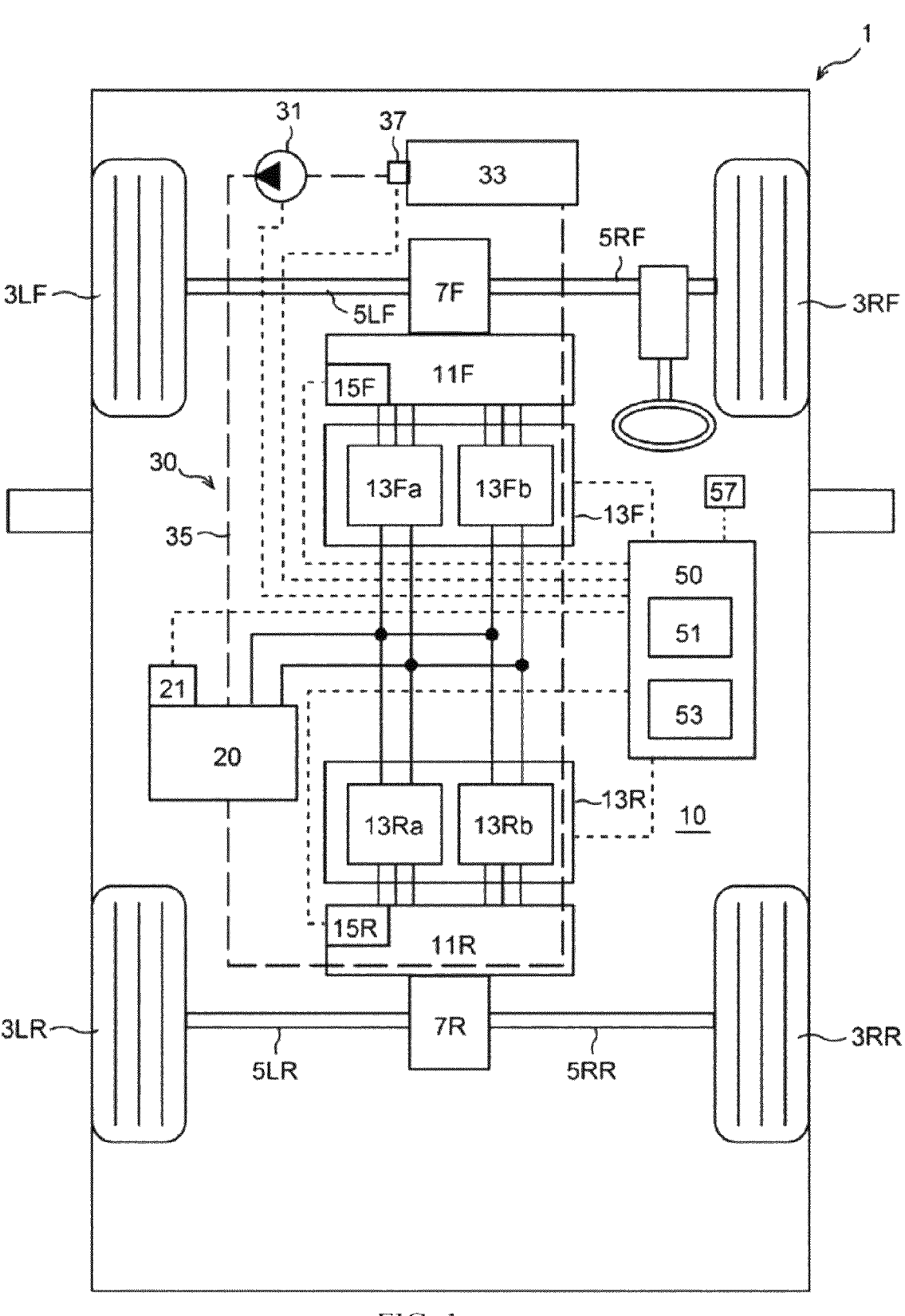
FIG. 1 is a schematic diagram of a configuration example of an electric vehicle including a motor control system according to an embodiment of the disclosure.

The battery temperature control device described in JP-A No. H06-24238 utilizes the motor and an inverter as the heat generation members that generate heat by the start-up of the vehicle. However, heat generated when the motor and the inverter are used in a normal use state after the start-up of the vehicle does not keep a high temperature. In particular, in the low-temperature environment such as a cold district, heat generated when the motor and the inverter are used in the normal use state is hard to become a high temperature. Thus, it takes time to warm up the battery, and it takes time to restore the charge and discharge performance of the battery.

It is desirable to provide a motor control system to be applied to an electric vehicle and an electric vehicle that make it possible to shorten time it takes to warm up a battery that supplies electric power to a motor.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Configuration of Motor Control System

Description is given first of an example of a configuration of a motor control system to be applied to an electric vehicle according to an embodiment of the disclosure.

FIG. 1 is a schematic diagram illustrating a configuration example of a vehicle 1 including a motor control system 10 according to the embodiment. In one embodiment of the disclosure, the vehicle 1 may serve as an "electric vehicle". As illustrated in the figure, the vehicle 1 may be a four-wheel automobile including a right front wheel 3RF, a left front wheel 3LF, a right rear wheel 3RR, and a left rear wheel 3LR. In the following, the right front wheel 3RF and the left front wheel 3LF are collectively referred to as "front wheels 3F". The right rear wheel 3RR and the left rear wheel 3LR are collectively referred to as "rear wheels 3R". The vehicle 1 may be a four-wheel drive vehicle including a first motor 11F and a second motor 11R as driving force sources that generate a driving torque for the vehicle 1. The first motor 11F and the second motor 11R may independently drive the front wheels and the rear wheels, respectively.

The motor control system 10 may include, for example, the first motor 11F, the second motor 11R, a first inverter unit 13F, a second inverter unit 13R, a battery 20, a cooling water circuit 30, and a control device 50. As the first motor 11F and the second motor 11R, for example, a three-phase AC radial motor or an axial gap motor may be used. However, there is no particular limitation on the number of phases. The first motor 11F may output a driving torque to be transmitted to the right and left front wheels 3F through a differential mechanism 7F, and a right front wheel drive shaft 5RF and a left front wheel drive shaft 5LF. The second motor 11R may output a driving torque to be transmitted to the right and left rear wheels 3R through a differential mechanism 7R, and a right rear wheel drive shaft 5RR and a left rear wheel drive shaft 5LR.

The first motor 11F and the second motor 11R may receive rotational torques of the front wheels 3F and the rear wheels 3R to perform regenerative power generation during deceleration of the vehicle 1. The rotational torques of the front wheels 3F and the rear wheels 3R are transmitted through the right front wheel drive shaft 5RF, the left front wheel drive shaft 5LF, the right rear wheel drive shaft 5RR, and the left rear wheel drive shaft 5LR. Driving and regeneration of the first motor 11F and the second motor 11R may be controlled by the control device 50.

The first motor 11F and the second motor 11R each have a rated output torque at which the first motor 11F and the second motor 11R are configured to continuously output a stable torque. The rated output torques of the first motor 11F and the second motor 11R may be the same, or alternatively, the rated output torques of the first motor 11F and the second motor 11R may be different. For example, when focusing on travel stability of the vehicle 1, the rated output torque of the first motor 11F may be made larger than the rated output torque of the second motor 11R. For example, when focusing on cornering performance of the vehicle 1, the rated output torque of the second motor 11R may be made larger than the rated output torque of the first motor 11F.

The first motor 11F may include a first motor temperature sensor 15F. The second motor 11R may include a second motor temperature sensor 15R. The first motor temperature sensor 15F and the second motor temperature sensor 15R detect temperatures of the respective motors and transmit data regarding the detected temperatures to the control device 50.

The battery 20 may include multiple battery cells each including a chargeable and dischargeable secondary battery. The battery 20 may be, for example, a lithium-ion battery having a rated voltage of 200 V, but there is no particular limitation on the rated voltage or the kind of the battery 20.

The battery 20 may be coupled to the first motor 11F and the second motor 11R through the first inverter unit 13F and the second inverter unit 13R, and accumulate electric power to be supplied to the first motor 11F and the second motor 11R. The battery 20 may include a battery management device 21. The battery management device 21 may detect, for example, an output current, an output voltage, and a battery temperature of the battery 20 and transmit the output current, the output voltage, and the battery temperature to the control device 50.

The first inverter unit 13F may control the driving and the regeneration of the first motor 11F. In this embodiment, the first inverter unit 13F may include a first inverter circuit 13Fa and a second inverter circuit 13Fb, and control the first motor 11F by the two inverter circuits 13Fa and 13Fb. Each of the first inverter circuit 13Fa and the second inverter circuit 13Fb may convert DC power swept from the battery 20 into three-phase AC power and supply the three-phase AC power to a stator of the first motor 11F. Moreover, each of the first inverter circuit 13Fa and the second inverter circuit 13Fb may convert three-phase AC power regenerated by the first motor 11F into DC power and charge the battery 20. Driving of the first inverter unit 13F may be controlled by the control device 50.

The second inverter unit 13R may control the driving and the regeneration of the second motor 11R. In this embodiment, the second inverter unit 13R may include a first inverter circuit 13Ra and a second inverter circuit 13Rb, and control the second motor 11R by the two inverter circuits 13Ra and 13Rb. Each of the first inverter circuit 13Ra and the second inverter circuit 13Rb may convert DC power swept from the battery 20 into three-phase AC power and supply the three-phase AC power to a stator of the second motor 11R. Each of the first inverter circuit 13Ra and the second inverter circuit 13Rb may convert three-phase AC power regenerated by the second motor 11R into DC power and charge the battery 20. Driving of the second inverter unit 13R may be controlled by the control device 50.

The cooling water circuit 30 may include a cooling water pump 31, a radiator 33, a cooling water circulation passage 35, and a cooling water temperature sensor 37. The cooling water pump 31 may be driven by being supplied with currents, and pump cooling water. The radiator 33 may cool the cooling water passing through inside, by heat exchange. The cooling water temperature sensor 37 may detect a temperature of the cooling water and output a sensor signal including data indicating the temperature of the cooling water, to the control device 50.

The cooling water circuit 30 illustrated in the figure may allow the cooling water discharged by the cooling water pump 31 to pass through the battery 20, the second motor 11R, the second inverter unit 13R, the first inverter unit 13F, the first motor 11F, and the radiator 33 in this order, and thereafter, circulate to the cooling water pump 31. The cooling water may receive heat from the battery 20, the second motor 11R, the second inverter unit 13R, the first inverter unit 13F, and the first motor 11F, and cool the battery 20, the second motor 11R, the second inverter unit 13R, the first inverter unit 13F, and the first motor 11F by heat exchange. The cooling water is cooled by dissipating heat while passing through the radiator 33.

It is to be noted that a position where the cooling water temperature sensor 37 is disposed is not limited to the illustrated example. However, to detect the temperature of the cooling water to be supplied to the battery 20, the cooling water temperature sensor 37 may be disposed between the radiator 33 and the battery 20. Moreover, as described later, the cooling water circuit 30 may be also used in a warm-up control of the battery 20.

The control device 50 may serve as a device configured to control the driving of the first motor 11F and the second motor 11R by one or more processors executing a computer program. The computer program is a computer program that causes a processor to perform operation described later to be carried out by the control device 50. The computer program to be executed by the processor may be recorded in a recording medium that serves as the storage 53, i.e., a memory, provided in the control device 50. Alternatively, the computer program to be executed by the processor may be recorded in a recording medium built in the control device 50, or any recording medium externally attachable to the control device 50.

The recording medium that contains the computer program may be: a magnetic medium such as a hard disk, a floppy disk, and a magnetic tape; an optical recording medium such as a CD-ROM (Compact Disk Read Only Memory), a DVD (Digital Versatile Disk), an SSD (Solid State Drive), and a Blu-ray (registered trademark); a magneto-optical medium such as a floptical disk; a storage device such as a RAM (Random Access Memory) and a ROM (Read Only Memory); and a flash memory such as a USB (Universal Serial Bus) memory; or other media configured to hold programs.

To the control device 50, the first motor temperature sensor 15F, the second motor temperature sensor 15R, the battery management device 21, the cooling water temperature sensor 37, and a vehicle state sensor 57 may be coupled through a dedicated line or a communication network such as the CAN (Controller Area Network) or the LIN (Local Inter Net). Moreover, to the control device 50, the first inverter unit 13F and the second inverter unit 13R may be coupled through the dedicated line or the communication network such as the CAN or the LIN. A configuration of the control device 50 is described in detail later.

The vehicle state sensor 57 may include one or more sensors configured to detect an operation state and behavior of the vehicle 1. The vehicle state sensor 57 may include an accelerator position sensor and a vehicle speed sensor. The accelerator position sensor may detect at least accelerator opening. The vehicle speed sensor may detect a vehicle speed. In addition, the vehicle state sensor 57 may include, for example, a steering angle sensor, a brake stroke sensor, or a brake pressure sensor. The vehicle state sensor 57 may further include, for example, one or both of an acceleration rate sensor and an angular velocity sensor. The vehicle state sensor 57 may transmit a sensor signal including the detected data, to the control device 50.

2. Configuration of Driver Circuit of Motor

Description is given next of a configuration of a driver circuit of the motor of the motor control system according to this embodiment.

Figure 2:
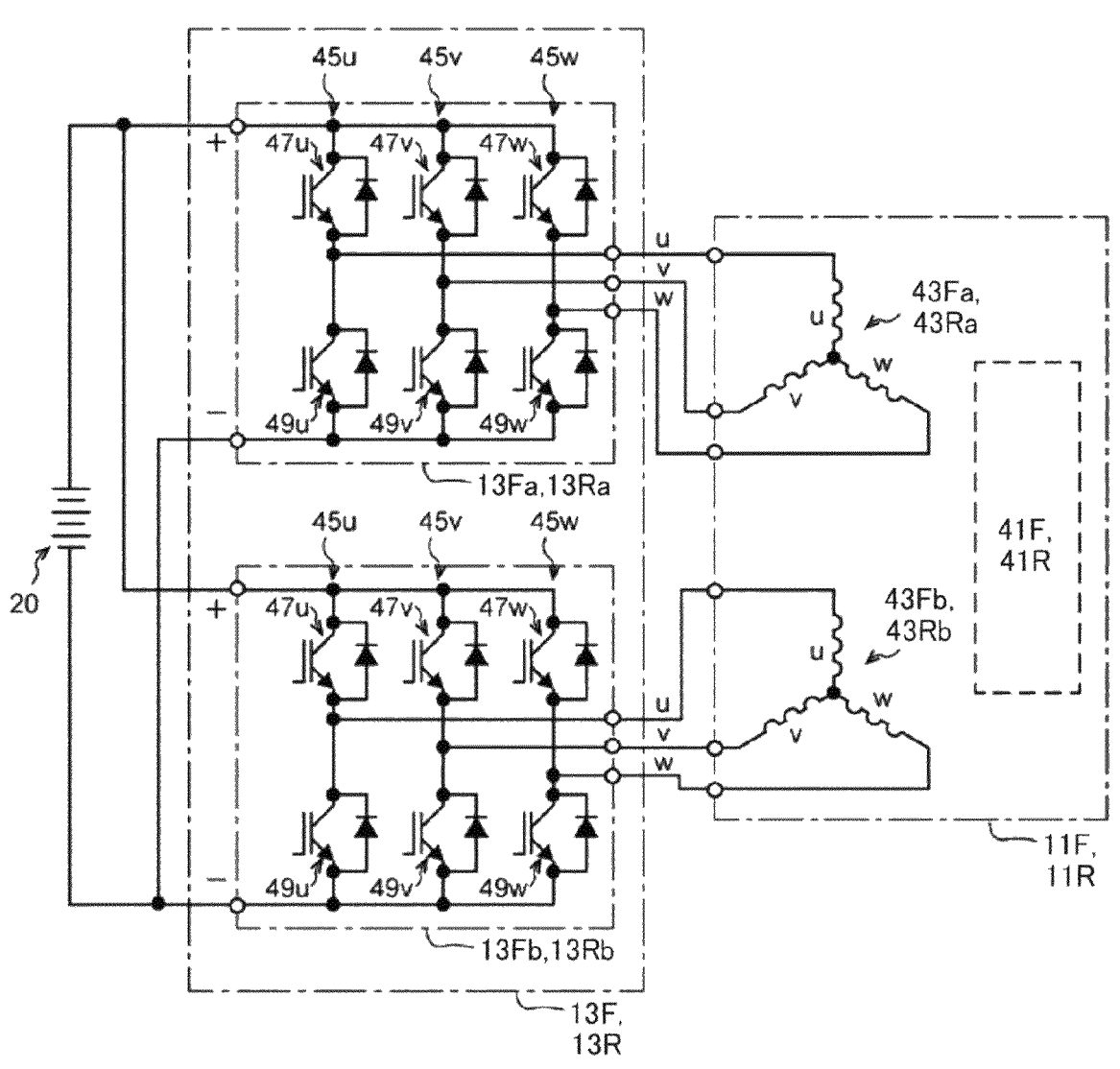
FIG. 2 is a circuit diagram of a driver circuit of a motor of the motor control system according to the embodiment.

FIG. 2 is a circuit diagram of a driver circuit of the first motor 11F and the second motor 11R. The driver circuit of the first motor 11F and the driver circuit of the second motor 11R have the same configuration. Thus, in FIG. 2, the driver circuit of one motor is illustrated.

In this embodiment, the first motor 11F may include one rotor 41F and two sets of three-phase stator coils 43Fa and 43Fb. Similarly, the second motor 11R may include one rotor 41R and two sets of three-phase stator coils 43Ra and 43Rb. When the motor is a single-stator radial motor, two sets of three-phase stator coils insulated from each other are assembled to one stator. When the motor is a double-stator axial gap motor, a three-phase stator coil is assembled to each of two stators arranged on both axial sides of the rotor.

The first inverter circuit 13Fa and the second inverter circuit 13Fb may each include multiple switching elements. Driving of the switching elements of the first inverter circuit 13Fa and the second inverter circuit 13Fb may be controlled by the control device 50. The first inverter circuit 13Ra and the second inverter circuit 13Rb may each include multiple switching elements. Driving of the switching elements of the first inverter circuit 13Ra and the second inverter circuit 13Rb may be controlled by the control device 50.

The first inverter circuit 13Fa may be electrically coupled to the first stator coil 43Fa of the first motor 11F. The first inverter circuit 13Fa may include three arm circuits 45u, 45v, and 45w (hereinafter, simply referred to as arm circuits 45 unless distinction is particularly necessary). The arm circuit 45u may be electrically coupled to a u-phase coil of the first stator coil 43Fa of the first motor 11F. The arm circuit 45v may be electrically coupled to a v-phase coil of the first stator coil 43Fa of the first motor 11F. The arm circuit 45w may be electrically coupled to a w-phase coil of the first stator coil 43Fa of the first motor 11F. The first inverter circuit 13Ra may be electrically coupled to the first stator coil 43Ra of the second motor 11R. The first inverter circuit 13Ra may include three arm circuits 45u, 45v, and 45w (hereinafter, simply referred to as the arm circuits 45 unless distinction is particularly necessary). The arm circuit 45u may be electrically coupled to a u-phase coil of the first stator coil 43Ra of the second motor 11R. The arm circuit 45v may be electrically coupled to a v-phase coil of the first stator coil 43Ra of the second motor 11R. The arm circuit 45w may be electrically coupled to a w-phase coil of the first stator coil 43Ra of the second motor 11R.

Each of the arm circuits 45 may include an upper arm on upstream side of the current and a lower arm on downstream side of the current. The upper arm is electrically coupled to positive electrode side of the battery 20. The lower arm is electrically coupled to negative electrode side of the battery 20. The upper arm and the lower arm of each of the arm circuits 45 may each include switching elements 47u, 49u, 47v, 49v, 47w, and 49w to each of which a diode is electrically coupled in anti-parallel. The switching elements 47u, 49u, 47v, 49v, 47w, and 49w may be, for example, a MOSFET (Metal Oxide Semiconductor Field Effect Transistor) or an IGBT (Insulated Gate Bipolar Transistor). However, the switching elements 47u, 49u, 47v, 49v, 47w, and 49w may also be other switching elements.

In the first motor 11F, driving the first inverter circuit 13Fa and the second inverter circuit 13Fb causes supply of three-phase AC power to one or both of the first stator coil 43Fa and the second stator coil 43Fb, whereby the rotor 41F is rotationally driven to output the driving torque. Moreover, in the first motor 11F, driving the first inverter circuit 13Fa and the second inverter circuit 13Fb causes supply of regenerative power generated by one or both of the first stator coil 43Fa and the second stator coil 43Fb to the battery 20. In the second motor 11R, driving the first inverter circuit 13Ra and the second inverter circuit 13Rb causes supply of three-phase AC power to one or both of the first stator coil 43Ra and the second stator coil 43Rb, whereby the rotor 41R is rotationally driven to output the driving torque. Moreover, in the second motor 11R, driving the first inverter circuit 13Ra and the second inverter circuit 13Rb causes supply of regenerative power generated by one or both of the first stator coil 43Ra and the second stator coil 43Rb to the battery 20.

It is to be noted that a converter circuit configured to step up and step down a voltage may be provided between the battery 20 and each inverter circuit.

3. Control Device

Description now moves on to details of the configuration of the control device 50.

In the following description, rotation of the first motor 11F and the second motor 11R in a forward direction of the vehicle 1 is referred to as "forward rotation". Rotation of the first motor 11F and the second motor 11R in a backward direction of the vehicle 1 is referred to as "counter-rotation".

Figure 3:
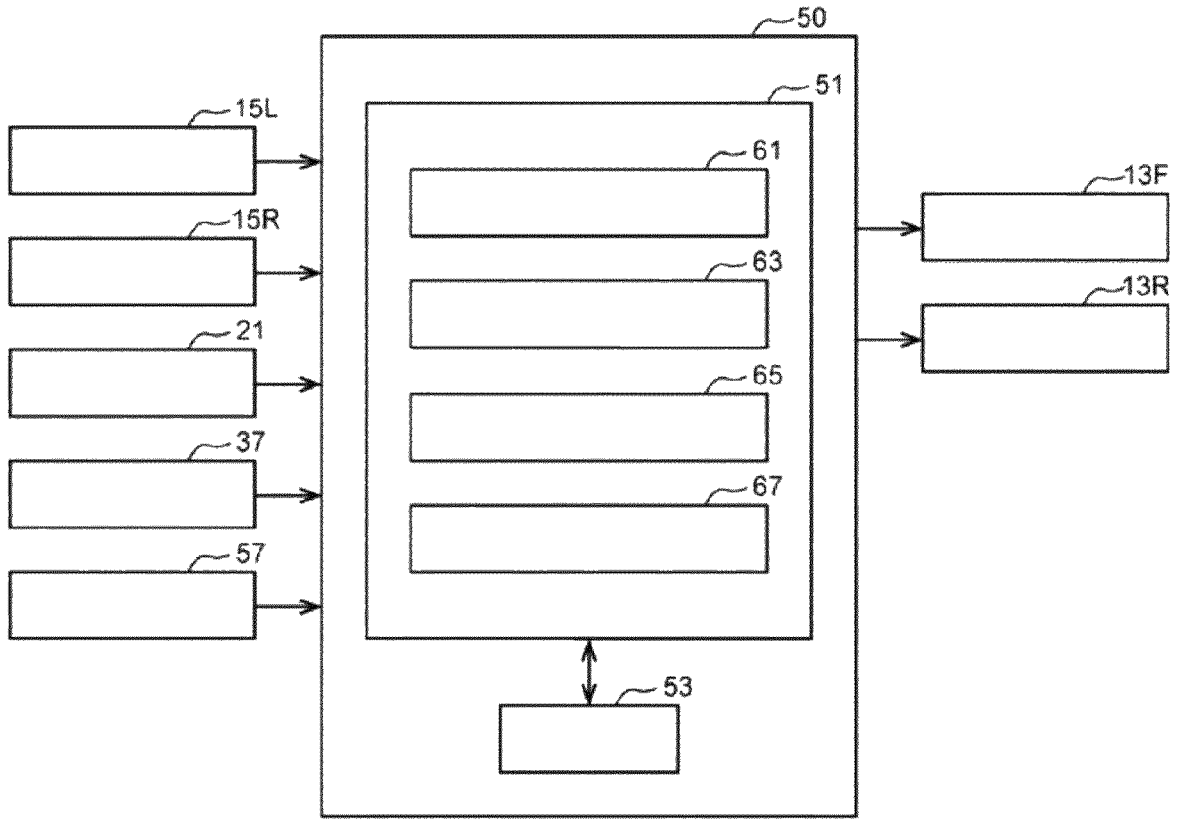
FIG. 3 is a block diagram of a configuration example of a control device of the motor control system according to the embodiment.

FIG. 3 is a block diagram illustrating the configuration of the control device 50 of the motor control system 10 according to this embodiment.

The control device 50 may include a processor 51 and a storage 53. The processor 51 may include one or more processors such as a CPU. All or a part of the processor 51 may include updatable one such as firmware, or may be, for example, a program module to be executed by a command from, for example, a CPU. The storage 53 may include one or more memories such as a RAM (Random Access Memory), a ROM (Read Only Memory), or an SSD (Solid State Drive). However, there is no particular limitation on the number of the storages 53 and the kind of the storage 53. The storage 53 may hold a computer program to be executed by the processor 51, and data such as various parameters to be used in calculation processing, detection data, and calculation results.

The processor 51 of the control device 50 may include a target torque setting unit 61, a motor controller 63, a cooling water circuit controller 65, and a battery warm-up controller 67. Each of these units may be realized by a processor such as a CPU executing a computer program, but some of them may include analogue circuitry. In the following, examples of processing operation are described after brief description of each unit of the processor 51.

(Target Torque Setting Unit)

The target torque setting unit 61 may set target torques of the first motor 11F and the second motor 11R when warm-up processing of the battery 20 is stopped. In this embodiment, when the warm-up processing of the battery 20 is being carried out, the target torques of the first motor 11F and the second motor 11R may be set by the battery warm-up controller 67 described later.

In one example, when the warm-up processing of the battery 20 is stopped, the target torque setting unit 61 may set the target output torque of each of the first motor 11F and the second motor 11R based on a requested driving torque of the vehicle 1. In manual driving, the requested driving torque may be calculated based on an amount of stepping down of an accelerator pedal and the vehicle speed. In automated driving, the requested driving torque may be calculated based on a requested acceleration rate obtained by calculation.

The target torque setting unit 61 may set, for example, a ratio between the target output torque of the first motor 11F and the target output torque of the second motor 11R to a driving torque ratio set in advance. The driving torque ratio may be set to, for example, a range of 4:6 to 6:4 depending on desired travel performance. For example, when focusing on the travel stability of the vehicle 1, the target output torque of the first motor 11F may be made larger than the target output torque of the second motor 11R. For example, when focusing on the cornering performance of the vehicle 1, the target output torque of the second motor 11R may be made larger than the target output torque of the first motor 11F. It is to be noted that the driving torque ratio may be variable with a driving state of the vehicle 1.

Moreover, the target torque setting unit 61 may determine whether to drive the first motor 11F by only one of the first stator coil 43Fa and the second stator coil 43Fb, or whether to drive the first motor 11F by both the first stator coil 43Fa and the second stator coil 43Fb, in accordance with magnitude of the target output torque of the first motor 11F. The target torque setting unit 61 may determine whether to drive the second motor 11R by only one of the first stator coil 43Ra and the second stator coil 43Rb, or whether to drive the second motor 11R by both the first stator coil 43Ra and the second stator coil 43Rb, in accordance with magnitude of the target output torque of the second motor 11R. This makes it possible to enhance driving efficiency caused by, for example, an electric power loss and wiring resistance due to operation of the switching elements.

For example, when the target output torque is smaller than a predetermined threshold value, the target torque setting unit 61 may determine that the first motor 11F is to be driven by only one of the first stator coil 43Fa and the second stator coil 43Fb, and the second motor 11R is to be driven by only one of the first stator coil 43Ra and the second stator coil 43Rb. In this case, the target torque setting unit 61 may set the target output torque of the first motor 11F as the target output torque of any one of the first stator coil 43Fa and the second stator coil 43Fb, and set the target output torque of the other stator coil to zero. The target torque setting unit 61 may set the target output torque of the second motor 11R as the target output torque of any one of the first stator coil 43Ra and the second stator coil 43Rb, and set the target output torque of the other stator coil to zero.

When the target output torque is equal to or greater than the predetermined threshold value, the target torque setting unit 61 may determine that the first motor 11F is to be driven by both the first stator coil 43Fa and the second stator coil 43Fb, and the second motor 11R is to be driven by both the first stator coil 43Ra and the second stator coil 43Rb. In this case, the target torque setting unit 61 may set one-half of the target output torque of the first motor 11F as the target output torque of each of the first stator coil 43Fa and the second stator coil 43Fb. The target torque setting unit 61 may set one-half of the target output torque of the second motor 11R as the target output torque of each of the first stator coil 43Ra and the second stator coil 43Rb.

The target torque setting unit 61 may constantly drive the first motor 11F by both the first stator coil 43Fa and the second stator coil 43Fb, and drive the second motor 11R by both the first stator coil 43Ra and the second stator coil 43Rb. In this case, the target torque setting unit 61 may set one-half of the target output torque of the first motor 11F as the target output torque of each of the first stator coil 43Fa and the second stator coil 43Fb, and set one-half of the target output torque of the second motor 11R as the target output torque of each of the first stator coil 43Ra and the second stator coil 43Rb.

When the warm-up processing of the battery 20 is stopped, the target torque setting unit 61 may set a target regenerative torque of each of the first motor 11F and the second motor 11R based on a requested braking torque of the vehicle 1. In the manual driving, the requested braking torque may be calculated based on the amount of stepping down of the accelerator pedal and the vehicle speed. In the automated driving, the requested driving torque may be calculated based on the requested acceleration rate obtained by calculation.

The target torque setting unit 61 may set, for example, a ratio between the target regenerative torque of the first motor 11F and the target regenerative torque of the second motor 11R to a regenerative torque ratio set in advance. The regenerative torque ratio may be set to, for example, 6:4. It is to be noted that the regenerative torque ratio may be variable with the driving state of the vehicle 1.

Moreover, the target torque setting unit 61 may determine whether to allow the first motor 11F to regenerate by only one of the first stator coil 43Fa and the second stator coil 43Fb, or whether to allow the first motor 11F to regenerate by both the first stator coil 43Fa and the second stator coil 43Fb, in accordance with magnitude of the target regenerative torque of the first motor 11F. The target torque setting unit 61 may determine whether to allow the second motor 11R to regenerate by only one of the first stator coil 43Ra and the second stator coil 43Rb, or whether to allow the second motor 11R to regenerate by both the first stator coil 43Ra and the second stator coil 43Rb, in accordance with magnitude of the target regenerative torque of the second motor 11R. This makes it possible to enhance regeneration efficiency caused by, for example, the power loss and the wiring resistance due to the operation of the switching elements.

For example, when the target regenerative torque is smaller than a predetermined threshold value, the target torque setting unit 61 may determine that the first motor 11F is to be allowed to regenerate by only one of the first stator coil 43Fa and the second stator coil 43Fb, and determine that the second motor 11R is to be allowed to regenerate by only one of the first stator coil 43Ra and the second stator coil 43Rb. In this case, the target torque setting unit 61 may set the target regenerative torque of the first motor 11F as the target regenerative torque of any one of the first stator coil 43Fa and the second stator coil 43Fb, and set the target regenerative torque of the other stator coil to zero. The target torque setting unit 61 may set the target regenerative torque of the second motor 11R as the target regenerative torque of any one of the first stator coil 43Ra and the second stator coil 43Rb, and set the target regenerative torque of the other stator coil to zero.

When the target regenerative torque is equal to or greater than the predetermined threshold value, the target torque setting unit 61 may determine that the first motor 11F is to be allowed to regenerate by both the first stator coil 43Fa and the second stator coil 43Fb, and determine that the second motor 11R is to be allowed to regenerate by both the first stator coil 43Ra and the second stator coil 43Rb. In this case, the target torque setting unit 61 may set one-half of the target regenerative torque of the first motor 11F as the target regenerative torque of each of the first stator coil 43Fa and the second stator coil 43Fb, and set one-half of the target regenerative torque of the second motor 11R as the target regenerative torque of each of the first stator coil 43Ra and the second stator coil 43Rb.

The target torque setting unit 61 may constantly allow the first motor 11F to regenerate by both the first stator coil 43Fa and the second stator coil 43Fb, and allow the second motor 11R to regenerate by both the first stator coil 43Ra and the second stator coil 43Rb. In this case, the target torque setting unit 61 may set one-half of the target regenerative torque of the first motor 11F as the target regenerative torque of each of the first stator coil 43Fa and the second stator coil 43Rb, and set one-half of the target regenerative torque of the second motor 11R as the target regenerative torque of each of the first stator coil 43Ra and the second stator coil 43Rb.

(Motor Controller)

The motor controller 63 may control the driving of the first inverter unit 13F and the second inverter unit 13R, and control the driving and the regeneration of the first motor 11F and the second motor 11R. In one example, the motor controller 63 may control the driving of the first inverter unit 13F based on the target output torque and the target regenerative torque set in the first stator coil 43Fa and the second stator coil 43Fb of the first motor 11F. The motor controller 63 may control the driving of the second inverter unit 13R based on the target output torque and the target regenerative torque set in the first stator coil 43Ra and the second stator coil 43Rb of the second motor 11R.

In one example, the motor controller 63 may set a driving duty ratio of the switching elements provided in the first inverter circuit 13Fa and the second inverter circuit 13Fb of the first inverter unit 13F, to control the operation of the switching elements. The motor controller 63 may set a driving duty ratio of the switching elements provided in the first inverter circuit 13Ra and the second inverter circuit 13Rb of the second inverter unit 13R, to control the operation of the switching elements. Thus, the driving torque corresponding to the target output torque is outputted from the first motor 11F and the second motor 11R. Alternatively, a braking torque corresponding to the target regenerative torque is generated by the first motor 11F and the second motor 11R.

(Cooling Water Circuit Controller)

The cooling water circuit controller 65 may control driving of the cooling water circuit 30 and control circulation of the cooling water in the cooling water circulation passage 35. The cooling water circuit controller 65 may acquire data regarding the battery temperature transmitted from the battery management device 21. When the battery temperature is equal to or higher than a predetermined cooling start threshold value, the cooling water circuit controller 65 may start driving of the cooling water pump 31, causing the circulation of the cooling water in the cooling water circulation passage 35. This leads to suppression of an increase in the battery temperature, making it possible to suppress a decline in charge and discharge performance of the battery 20.

Moreover, when a command to start the driving of the cooling water circuit 30 is generated by the battery warm-up controller 67 described later, the cooling water circuit controller 65 may control the driving of the cooling water circuit 30 and control the circulation of the cooling water in the cooling water circulation passage 35. This causes the increase in the battery temperature, making it possible to enhance the charge and discharge performance of the battery 20.

(Battery Warm-up Controller)

The battery warm-up controller 67 may carry out the warm-up control of the battery 20 when the temperature of the battery 20 is low. In this embodiment, the battery warm-up controller 67 may drive the cooling water pump 31 to circulate the cooling water in the cooling water circulation passage 35. Moreover, the battery warm-up controller 67 may drive the first inverter circuit 13Fa and the second inverter circuit 13Fb of the first inverter unit 13F, to apply the oppositely directed rotational torques to the rotor 41F of the first motor 11F. The battery warm-up controller 67 may drive the first inverter circuit 13Ra and the second inverter circuit 13Rb of the second inverter unit 13R, to apply the oppositely directed rotational torques to the rotor 41R of the second motor 11R. This causes heat generation of the first motor 11F and the second motor 11R, causing the cooling water to be heated by heat exchange. By the cooling water thus heated, the battery 20 is warmed up.

Description is made by giving an example of the driver circuit of the motor illustrated in FIG. 2. The battery warm-up controller 67 may control the driving of the first inverter unit 13F to make opposite to each other the rotational torque to be applied to the rotor 41F by the first stator coil 43Fa of the first motor 11F and the rotational torque to be applied to the rotor 41F by the second stator coil 43Fb. The battery warm-up controller 67 may control the driving of the second inverter unit 13R to make opposite to each other the rotational torque to be applied to the rotor 41R by the first stator coil 43Ra of the second motor 11R and the rotational torque to be applied to the rotor 41R by the second stator coil 43Rb. Thus, a current value to be supplied to the first stator coil 43Fa and the second stator coil 43Fb of the first motor 11F increases by an amount corresponding to cancellation of the rotational torques. A current value to be supplied to the first stator coil 43Ra and the second stator coil 32Rb of the second motor 11R increases by the amount corresponding to the cancellation of the rotational torques. An energy loss corresponding to the canceled rotational torques is consumed as thermal energy. This causes a rapid increase in the temperature of the first motor 11F and causes a rapid increase in the temperature of the second motor 11R, causing the cooling water to be heated efficiently. Hence, it is possible to warm up the battery 20 efficiently.

The battery warm-up controller 67 may make a sum of the rotational torque to be applied to the rotor 41F by the first stator coil 43Fa and the rotational torque to be applied to the rotor 41F by the second stator coil 43Fb identical with the target output torque of the first motor 11F. The battery warm-up controller 67 may make a sum of the rotational torque to be applied to the rotor 41R by the first stator coil 43Ra and the rotational torque to be applied to the rotor 41R by the second stator coil 43Rb identical with the target output torque of the second motor 11R. The target output torques of the first motor 11F and the second motor 11R may be obtained by a similar method to the calculation processing by the target torque setting unit 61.

For example, when warming up the battery 20 after a start-up of the motor control system 10 and before a start of the travel of the vehicle 1, the battery warm-up controller 67 may apply the oppositely directed rotational torques of the same magnitude to the rotor 41F to cause the first motor 11F to generate heat while keeping the output torque from the first motor 11F to zero. The battery warm-up controller 67 may apply the oppositely directed rotational torques of the same magnitude to the rotor 41R to cause the second motor 11R to generate heat while keeping the output torque from the second motor 11R to zero. In this case, the battery warm-up controller 67 may bring the sum of the rotational torque to be applied to the rotor 41F by the first stator coil 43Fa and the rotational torque to be applied to the rotor 41F by the second stator coil 43Fb to zero. The battery warm-up controller 67 may bring the sum of the rotational torque to be applied to the rotor 41R by the first stator coil 43Ra and the rotational torque to be applied to the rotor 41R by the second stator coil 43Rb to zero. Hence, it is possible to warm up the battery 20 without generating the driving force in the vehicle 1.

Meanwhile, after starting the travel of the vehicle 1, the battery warm-up controller 67 may make the sum of the rotational torque to be applied to the rotor 41F by the first stator coil 43Fa and the rotational torque to be applied to the rotor 41F by the second stator coil 43Fb identical with the target output torque of the first motor 11F. The battery warm-up controller 67 may make the sum of the rotational torque to be applied to the rotor 41R by the first stator coil 43Ra and the rotational torque to be applied to the rotor 41R by the second stator coil 43Rb identical with the target output torque of the second motor 11R. Hence, it is possible to warm up the battery 20 while outputting the driving torque corresponding to the requested driving torque of the vehicle 1. For example, the first stator coil 43Fa is allowed to apply a constant counter-rotational torque to the rotor 41F, while the second stator coil 43Fb is allowed to apply a sum of a forward rotational torque that cancels the counter-rotational torque and a forward rotational torque corresponding to the target output torque. The first stator coil 43Ra is allowed to apply a constant counter-rotational torque to the rotor 41R, while the second stator coil 43Rb is allowed to apply a sum of a forward rotational torque that cancels the counter-rotational torque and a forward rotational torque corresponding to the target output torque. However, the method of setting each of the rotational torques to be applied to the rotor 41F by the first stator coil 43Fa and the second stator coil 43Fb is not limited to those described above. The method of setting each of the rotational torques to be applied to the rotor 41R by the first stator coil 43Ra and the second stator coil 43Rb is not limited to those described above.

While warming up the battery 20, the battery warm-up controller 67 may switch which motor to allow to generate heat, at predetermined timing. The timing of the switching which motor to allow to generate heat may be determined based on, for example, a temperature of the motor, elapsed time since a start of heat generation of the motor, or an amount of current supply to the stator coil. By warming up the battery 20 while alternately switching which motor to allow to generate heat, it is possible to continue warming up the battery 20 while preventing a high-temperature state in which the temperature of each motor becomes in excess of a predetermined temperature.

Moreover, after the start-up of the motor control system 10, before starting outputting the driving torque from the first motor 11F and the second motor 11R, the battery warm-up controller 67 may repetitively switch which motor to allow to generate heat, to alternately raise the temperatures of the first motor 11F and the second motor 11R. By alternately switching which motor to allow to generate heat to raise the temperatures of the motors, it is possible to reduce a temperature difference between the motors at an end of the warming up of the battery 20. Hence, it is possible to prevent a change in output performance of the first motor 11F and the second motor 11R due to the temperature difference between the motors.

When allowing the motors to generate heat while alternately switching which motor to allow to generate heat, the battery warm-up controller 67 may sequentially allow the motors to generate heat in the order of closeness to the battery 20 from the first motor 11F toward the upstream side of the battery 20 in a direction of the circulation of the cooling water circulating in the cooling water circuit 30. Thus, it is possible to prevent a decline in cooling efficiency of the battery 20 because of transmission of heat to other devices before the cooling water heated by the heat generated by the motors reaches the battery 20.

For example, when allowing the second motor 11R to generate heat first, the heated cooling water passes through the second inverter unit 13R, the first inverter unit 13F, the first motor 11F, and the radiator 33 before reaching the battery 20. This causes the heat of the cooling water to be dissipated to the second inverter unit 13R, the first inverter unit 13F, the first motor 11F, and the radiator 33. In contrast, when allowing the first motor 11F to generate heat first, the heated cooling water does not pass through the second inverter unit 13R, the first inverter unit 13F, and the first motor 11F. Hence, it is possible to reduce an amount of heat dissipation.

When the rated output torques of the first motor 11F and the second motor 11R differ, the battery warm-up controller 67 may generate heat in the decreasing order of the rated output torques of the motors. As the rated output torque of the motor becomes greater, it is possible to increase the torque to be canceled by applying the oppositely directed rotational torques to the rotor 41F and the rotor 41R. Hence, as the rated output torque of the motor is greater, it is possible to increase the amount of heat generation, and rapidly raise the temperature of the cooling water.

While warming up the battery 20, the battery warm-up controller 67 may acquire data regarding the temperature of the cooling water outputted from the cooling water temperature sensor 37. When the temperature of the cooling water reaches a predetermined upper limit threshold value, the battery warm-up controller 67 may stop the process of applying the oppositely directed rotational torques to the rotor 41F and the rotor 41R. Thus, the temperature of the cooling water to be supplied to the battery 20 is maintained below a predetermined temperature, making it possible to suppress damage caused by overheating of the battery 20.

Furthermore, when an output voltage of the battery 20 is equal to or higher than a predetermined threshold value, the battery warm-up controller 67 may carry out a process of applying the oppositely directed rotational torques to the rotor 41F and the rotor 41R. This leads to suppression of an increase in power consumption by the process of applying the oppositely directed rotational torques to the rotor 41F and the rotor 41R when the output voltage of the battery 20 is lower than the threshold value. Hence, it is possible to suppress a decline in the voltage of the battery 20.

4. Processing Operation Example

In the forgoing, description is given of the configuration example of the motor control system 10 according to this embodiment. Description now moves on to an example of the battery warm-up processing operation by the control device 50 of the motor control system 10 with reference to flowcharts.

Figure 4:
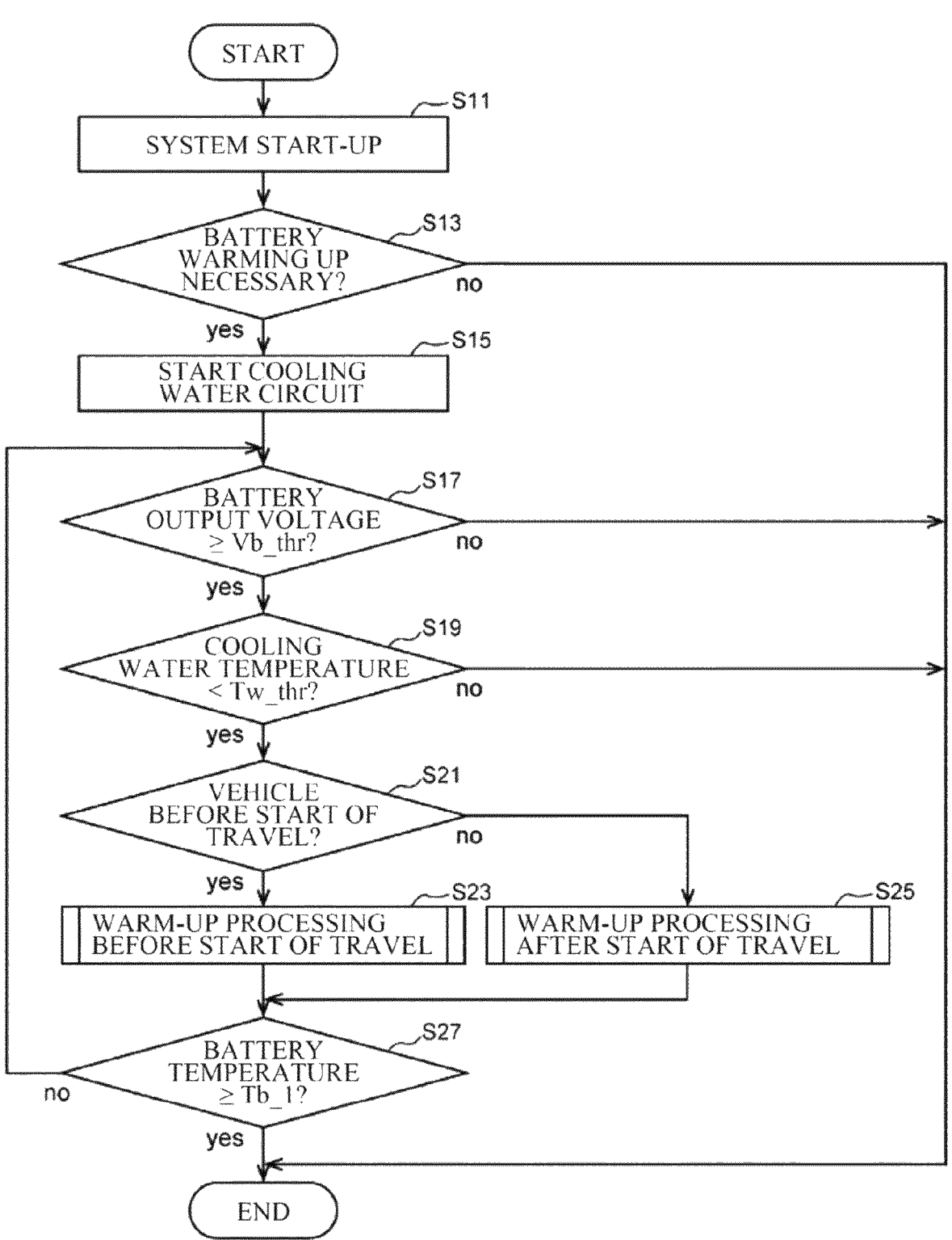
FIG. 4 is a flowchart of an operation example of battery warm-up processing by the motor control system according to the embodiment.

FIG. 4 is a flowchart illustrating an example of battery warm-up processing operation by the control device 50 according to this embodiment. In the following, an example is described in which the battery 20 is warmed up while which motor to allow to generate heat is switched based on the temperatures of the first motor 11F and the second motor 11R.

First, at the start-up of a drive system of the vehicle 1 (step S11), the battery warm-up controller 67 of the processor 51 may determine whether or not the warming up of the battery 20 is necessary (step S13). In one example, the battery warm-up controller 67 may acquire the data regarding the battery temperature Tb transmitted from the battery management device 21. When the battery temperature Tb is lower than a predetermined warm-up starting threshold value Tb_0, the battery warm-up controller 67 may determine that the warming up of the battery 20 is necessary. However, the method of determining whether or not the warming up of the battery 20 is necessary is not limited to the example mentioned above. For example, the battery warm-up controller 67 may determine whether or not the warming up of the battery 20 is necessary, based on an outside air temperature, or alternatively, the battery warm-up controller 67 may determine whether or not the warming up of the battery 20 is necessary, based on the outside air temperature and elapsed time since a stop of the motor control system 10.

When it is not determined that the warming up of the battery 20 is necessary (S13/No), the battery warm-up controller 67 may end the warm-up control processing of the battery 20. When it is determined that the warming up of the battery 20 is necessary (S13/Yes), the battery warm-up controller 67 may start up the cooling water circuit 30 (step S15). In one example, the battery warm-up controller 67 may generate a command for a start-up of the cooling water circuit 30, and the cooling water circuit controller 65 may start to drive the cooling water pump 31. An amount of driving of the cooling water pump 31 may be constant, or alternatively, the amount of driving of the cooling water pump 31 may be controlled based on, for example, discharge pressure or a discharge flow rate.

Thereafter, the battery warm-up controller 67 may determine whether or not the output voltage Vb of the battery 20 is equal to or higher than a predetermined threshold value Vb_thr (step S17). Here, it is determined whether or not the process of applying the oppositely directed rotational torques to the rotors 41F and 41R is practicable without causing the decline in the voltage of the battery 20. In the following, this process is also referred to as "counter-torque driving". The predetermined threshold value Vb_thr may be determined in accordance with a set value of the rotational torques to be canceled by the counter-torque driving. That is, as the set value of the rotational torques to be canceled becomes greater, the output current of the battery 20 to be outputted in the counter-torque driving becomes greater, and accordingly, the predetermined threshold value Vb_thr is set to a greater value.

When the output voltage Vb of the battery 20 is not equal to or higher than the predetermined threshold value Vb_thr (S17/No), the battery warm-up controller 67 may end the warm-up control processing of the battery 20. When the output voltage Vb of the battery 20 is equal to or higher than the predetermined threshold value Vb_thr (S17/Yes), the battery warm-up controller 67 may determine whether or not a temperature Tw of the cooling water is lower than a predetermined upper limit threshold value Tw_thr (step S19). Here, it is determined whether the temperature Tw of the cooling water is already high. The predetermined upper limit threshold value Tw_thr may be determined in accordance with a compensation temperature of the battery 20.

When the temperature Tw of the cooling water is not lower than the predetermined upper limit threshold value Tw_thr (S19/No), the battery warm-up controller 67 may end the warm-up control processing of the battery 20. This makes it possible to suppress damage caused by the battery 20 becoming overheated. When the temperature Tw of the cooling water is lower than the predetermined upper limit threshold value Tw_thr (S19/Yes), the battery warm-up controller 67 may determine whether or not the vehicle 1 is in a state before a start of travel (step S21). For example, the battery warm-up controller 67 may determine that the vehicle 1 is in the state before the start of travel, when the requested driving torque calculated based on data regarding the accelerator opening or the requested acceleration rate does not have a positive value greater than zero, after the start-up of the motor control system 10. However, the method of determining whether or not the vehicle 1 is in the state before the start of travel is not limited to the example mentioned above.

When it is determined that the vehicle 1 is in the state before the start of travel (S21/Yes), the battery warm-up controller 67 may carry out warm-up processing before the start of travel (step S23). When it is not determined that the vehicle 1 is in the state before the start of travel (S21/No), the battery warm-up controller 67 may carry out warm-up processing after the start of travel (step S25).

Figures 5, 6:
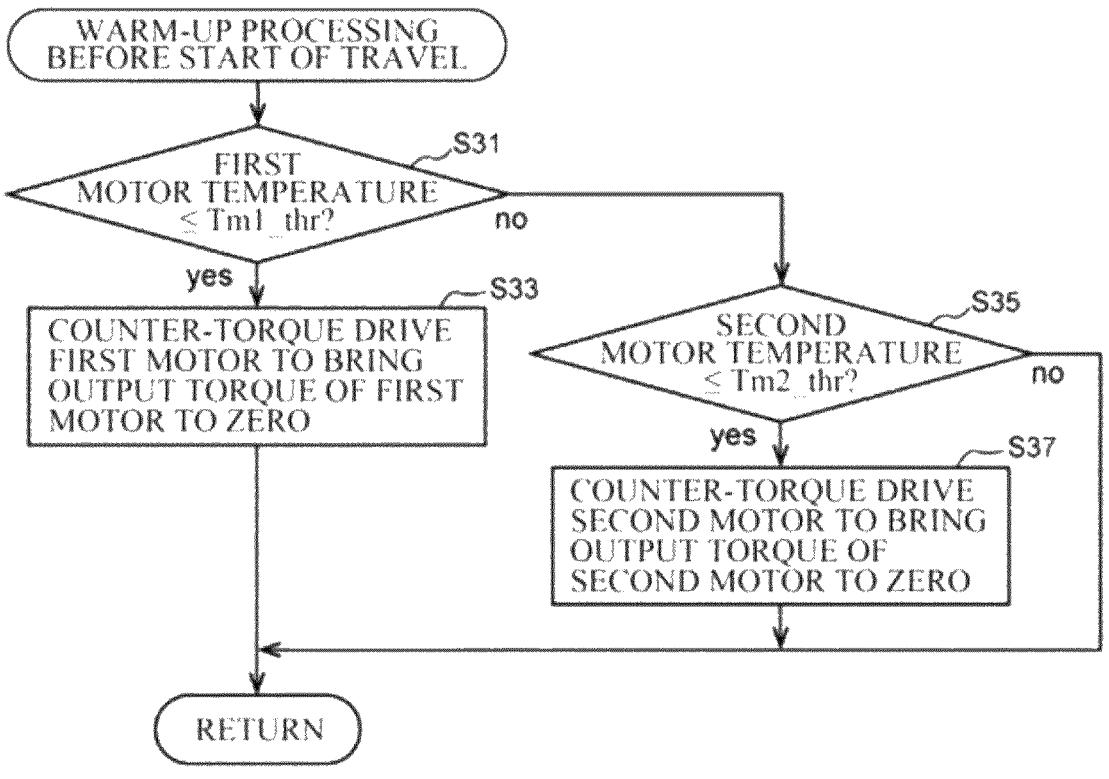
FIG. 5 is a flowchart of an operation example of warm-up processing before a start of travel by the motor control system according to the embodiment.
FIG. 6 is a diagram indicating a temperature of the motor in the warm-up processing before the start of travel by the motor control system according to the embodiment.

FIG. 5 is a flowchart illustrating an example of the warm-up processing before the start of travel.

In the state before the start of travel of the vehicle 1, the first motor 11F and the second motor 11R may be counter-torque driven, to inhibit the driving torque from being outputted from the first motor 11F and the second motor 11R.

The battery warm-up controller 67 may determine whether or not a temperature Tm1 of the first motor 11F is equal to or lower than a predetermined reference temperature Tm1_thr (step S31). In one example, the battery warm-up controller 67 may acquire data regarding the temperature Tm1 of the first motor 11F outputted from the first motor temperature sensor 15F provided in the first motor 11F, and determine whether or not the temperature Tm1 of the first motor 11F is equal to or lower than the predetermined reference temperature Tm1_thr set in advance. The predetermined reference temperature Tm1_thr may be set to a value of an allowable temperature in consideration of, for example, internal resistance of the first motor 11F that depends on the temperature Tm1 of the first motor 11F.

When the temperature Tm1 of the first motor 11F is equal to or lower than the predetermined reference temperature Tm1_thr (S31/Yes), the battery warm-up controller 67 may counter-torque drive the first motor 11F (step S33). In one example, the battery warm-up controller 67 may control the driving of the first inverter circuit 13Fa and the second inverter circuit 13Fb of the first inverter unit 13F, to apply the oppositely directed rotational torques of the same magnitude to the rotor 41F of the first motor 11F. This causes the canceled rotational torques to be consumed as thermal energy, causing an increase in the temperature of the first motor 11F. Thus, the amount of heat of the first motor 11F is transmitted to the battery 20 through the cooling water circulating in the cooling water circuit 30, causing the battery 20 to be heated, or warmed up.

When the temperature Tm1 of the first motor 11F is not equal to or lower than the predetermined reference temperature Tm1_thr (S31/No), the battery warm-up controller 67 may determine whether or not a temperature Tm2 of the second motor 11R is equal to or lower than a predetermined reference temperature Tm2_thr (step S35). In one example, the battery warm-up controller 67 may acquire data regarding the temperature Tm2 of the second motor 11R outputted from the second motor temperature sensor 15R provided in the second motor 11R, and determine whether or not the temperature Tm2 of the second motor 11R is equal to or lower than the predetermined reference temperature Tm2_thr set in advance. The predetermined reference temperature Tm2_thr may be set to a value of an allowable temperature in consideration of, for example, internal resistance of the second motor 11R that depends on the temperature Tm2 of the second motor 11R. When the first motor 11F and the second motor 11R are the same motor, the reference temperatures Tm1_thr and Tm2_thr may be the same value.

When the temperature Tm2 of the second motor 11R is equal to or lower than the predetermined reference temperature Tm2_thr (S35/Yes), the battery warm-up controller 67 may counter-torque drive the second motor 11R (step S37). In one example, the battery warm-up controller 67 may control the driving of the first inverter circuit 13Ra and the second inverter circuit 13Rb of the second inverter unit 13R, to apply the oppositely directed rotational torques of the same magnitude to the rotor 41R of the second motor 11R. This causes the canceled rotational torques to be consumed as thermal energy, causing an increase in the temperature of the second motor 11R. Thus, the amount of heat of the second motor 11R is transmitted to the battery 20 through the cooling water circulating in the cooling water circuit 30, causing the battery 20 to be heated, or warmed up.

When the temperature Tm2 of the second motor 11R is not equal to or lower than the predetermined reference temperature Tm2_thr (S35/No), the counter-torque driving is not performed with respect to both the first motor 11F and the second motor 11R, to prevent the first motor 11F and the second motor 11R from being overheated. In this case as well, the heat of the first motor 11F and the second motor 11R is transmitted to the battery 20 through the cooling water circulating in the cooling water circuit 30, causing the battery 20 to be heated, or warmed up.

It is to be noted that, as long as the vehicle 1 is in the state before the start of travel, the processing illustrated in FIG. 5 is repetitively carried out on predetermined processing cycles. Accordingly, when the counter-torque driving of the first motor 11F continues and the temperature Tm1 of the first motor 11F reaches the predetermined reference temperature Tm1_thr, a switchover is made to the counter-torque driving of the second motor 11R. When the counter-torque driving of the second motor 11R continues and the temperature Tm2 of the second motor 11R reaches the predetermined reference temperature Tm2_thr, a switchover is made to the counter-torque driving of the first motor 11F. During the counter-torque driving of the first motor 11F, the temperature of the second motor 11R lowers, and during the counter-torque driving of the second motor 11R, the temperature of the first motor 11F lowers.

Thus, before the start of travel of the vehicle 1, the first motor 11F and the second motor 11R are alternately counter-torque driven, causing an alternate increase in the temperatures of the first motor 11F and the second motor 11R. Hence, it is possible to reduce the possibility that either the first motor 11F or the second motor 11R is overheated, and prevent a significant increase in the difference between the temperature Tm1 of the first motor 11F and the temperature Tm2 of the second motor 11R.

FIG. 6 illustrates changes in the temperatures of the first motor 11F and the second motor 11R by the warm-up processing before the start of travel. In the example in FIG. 6, the first motor 11F and the second motor 11R are the same motor having the same rated output torque, and the predetermined reference temperatures Tm1_*thr* and Tm2_*thr* are the same value Tm_thr. Moreover, at the start-up of the motor control system 10, the first motor 11F and the second motor 11R each have a temperature corresponding to the outside air temperature.

After the start-up of the motor control system 10, when it is determined that the warming up of the battery 20 is necessary, first, the counter-torque driving of the first motor 11F is carried out in a first period Pr1_*m*1. The counter-torque driving of the second motor 11R may be carried out first, but in this embodiment, the counter-torque driving of the first motor 11F located closer to the battery 20 than the second motor 11R toward the upstream side of the flow of the cooling water from the battery 20 is carried out first. In the first period Pr1_*m*1, the temperature Tm1 of the first motor 11F increases, and the heat of the first motor 11F is transmitted to the battery 20 through the cooling water, causing the battery 20 to be heated.

When the temperature Tm1 of the first motor 11F reaches the predetermined reference temperature Tm_thr, the counter-torque driving of the second motor 11R is carried out in a subsequent second period Pr2_*m*2. In the second period Pr2_*m*2, the temperature Tm2 of the second motor 11R increases, and the heat of the second motor 11R is transmitted together with the heat of the first motor 11F to the battery 20 through the cooling water, causing the battery 20 to be heated. In the second period Pr2_*m*2, the temperature Tm1 of the first motor 11F decreases, but a rate of the decrease in the temperature Tm1 of the first motor 11F is lower than a rate of the increase in the temperature Tm2 of the second motor 11R. Accordingly, at timing when the temperature Tm2 of the second motor 11R reaches the predetermined reference temperature Tm_thr, the temperature Tm1 of the first motor 11F does not decrease to the outside air temperature.

When the temperature Tm2 of the second motor 11R reaches the predetermined reference temperature Tm_thr, the counter-torque driving of the first motor 11F is carried out in a subsequent third period Pr3_*m*1. In the third period Pr3_*m*1, the temperature Tm1 of the first motor 11F increases again, and the heat of the first motor 11F is transmitted together with the heat of the second motor 11R to the battery 20 through the cooling water, causing the battery 20 to be heated. In the third period Pr3_*m*1, the temperature Tm2 of the second motor 11R decreases, but a rate of the decrease in the temperature Tm2 of the second motor 11R is lower than a rate of the increase in the temperature Tm1 of the first motor 11F.

When the temperature Tm1 of the first motor 11F reaches the predetermined reference temperature Tm_thr again, the counter-torque driving of the second motor 11R is carried out in a subsequent fourth period Pr4_*m*2. In the fourth period Pr4_*m*2, the temperature Tm2 of the second motor 11R increases again, and the heat of the second motor 11R is transmitted together with the heat of the first motor 11F to the battery 20 through the cooling water, causing the battery 20 to be heated.

As described, by warming up the battery 20 by alternately allowing the first motor 11F and the second motor 11R to generate heat, the temperature Tm1 of the first motor 11F and the temperature Tm2 of the second motor 11R alternately increase. This makes it possible to reduce the temperature difference between the motors at the end of the warming up of the battery 20. Hence, it is possible to prevent the change in the output performance of the first motor 11F and the second motor 11R due to the temperature difference between the motors.

Figure 7:
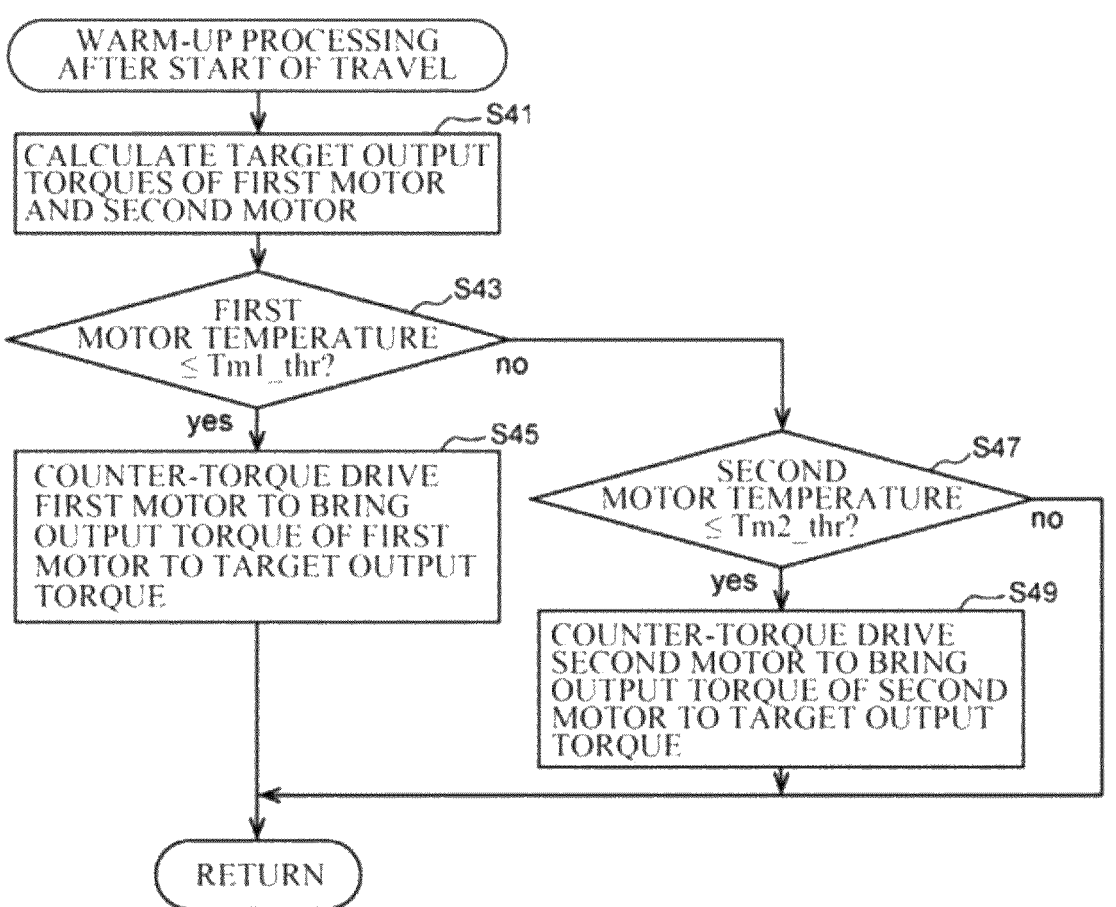
FIG. 7 is a flowchart of an operation example of warm-up processing after the start of travel by the motor control system according to the embodiment.

FIG. 7 is a flowchart illustrating an example of warm-up processing after the start of travel.

After the start of travel of the vehicle 1, the first motor 11F and the second motor 11R may be counter-torque driven to cause the driving torque corresponding to the target output torque to be outputted from each of the first motor 11F and the second motor 11R.

The battery warm-up controller 67 may calculate the target output torque of each of the first motor 11F and the second motor 11R (step S41). In one example, the battery warm-up controller 67 may set the target output torque of each of the first motor 11F and the second motor 11R based on the requested driving torque of the vehicle 1. In the manual driving, the requested driving torque may be calculated based on the amount of stepping down of the accelerator pedal and the vehicle speed. In the automated driving, the requested driving torque may be calculated based on the requested acceleration rate obtained by the calculation. Moreover, the battery warm-up controller 67 may set, for example, the ratio between the target output torque of the first motor 11F and the target output torque of the second motor 11R to the driving torque ratio set in advance. The driving torque ratio may be variable with the driving state of the vehicle 1. It is to be noted that the calculation of the target output torque may be made by the target torque setting unit 61, and the battery warm-up controller 67 may acquire a result of the calculation.

Thereafter, as with step S31 described above, the battery warm-up controller 67 may determine whether or not the temperature Tm1 of the first motor 11F is equal to or lower than the predetermined reference temperature Tm1_*thr* (step S43). When the temperature Tm1 of the first motor 11F is equal to or lower than the predetermined reference temperature Tm1_*thr* (S43/Yes), the battery warm-up controller 67 may counter-torque drive the first motor 11F (step S45). In this case, the battery warm-up controller 67 may counter-torque drive the first motor 11F to bring the driving torque to be outputted from the first motor 11F to the target output torque.

In one example, the battery warm-up controller 67 may make the sum of the rotational torque to be applied to the rotor 41F by the first stator coil 43Fa of the first motor 11F and the rotational torque to be applied to the rotor 41F by the second stator coil 43Fb identical with the target output torque of the first motor 11F. For example, the first stator coil 43Fa is allowed to apply the constant counter-rotational torque to the rotor 41F, while the second stator coil 43Fb is allowed to apply the sum of the forward rotational torque that cancels the counter-rotational torque and the forward rotational torque corresponding to the target output torque. However, the method of setting the rotational torques to be applied to the rotor 41F by the first stator coil 43Fa and the second stator coil 43Fb is not limited to the example described above. This causes the canceled rotational torques to be consumed as thermal energy, causing the increase in the temperature of the first motor 11F. Thus, the amount of heat of the first motor 11F is transmitted to the battery 20 through the cooling water circulating in the cooling water circuit 30, causing the battery 20 to be heated, or warmed up.

When the temperature Tm1 of the first motor 11F is not equal to or lower than the predetermined reference temperature Tm1_thr (S43/No), the battery warm-up controller 67 may determine, as with step S35 described above, whether or not the temperature Tm2 of the second motor 11R is equal to or lower than the predetermined reference temperature Tm2_thr (step S47). When the temperature Tm2 of the second motor 11R is equal to or lower than the predetermined reference temperature Tm2_thr (S47/Yes), the battery warm-up controller 67 may counter-torque drive the second motor 11R (step S49). In this case, the battery warm-up controller 67 may counter-torque drive the second motor 11R to bring the driving torque to be outputted from the second motor 11R to the target output torque. This causes the canceled rotational torques to be consumed as thermal energy, causing the increase in the temperature of the second motor 11R. Thus, the amount of heat of the second motor 11R is transmitted to the battery 20 through the cooling water circulating in the cooling water circuit 30, causing the battery 20 to be heated, or warmed up.

When the temperature Tm2 of the second motor 11R is not equal to or lower than the predetermined reference temperature Tm2_thr (S47/No), the counter-torque driving is not performed with respect to both the first motor 11F and the second motor 11R, to prevent the first motor 11F and the second motor 11R from being overheated. In this case as well, the heat of the first motor 11F and the second motor 11R is transmitted to the battery 20 through the cooling water circulating in the cooling water circuit 30, causing the battery 20 to be heated, or warmed up.

It is to be noted that, after the start of travel of the vehicle 1, the processing illustrated in FIG. 7 may be repetitively carried out on the predetermined processing cycles. Accordingly, when the temperature Tm1 of the first motor 11F reaches the predetermined reference temperature Tm1_thr, the switchover may be made to the counter-torque driving of the second motor 11R. When the temperature Tm2 of the second motor 11R reaches the predetermined reference temperature Tm2_thr, the switchover may be made to the counter-torque driving of the first motor 11F. Thus, after the start of travel of the vehicle 1, the first motor 11F and the second motor 11R are alternately counter-torque driven, making it possible to reduce the possibility that either the first motor 11F or the second motor 11R is overheated.

Moreover, the example of the processing illustrated in FIG. 7 is an example in which, after the start of travel of the vehicle 1, the counter-torque driving of the first motor 11F or the second motor 11R is carried out when the driving torque of the vehicle 1 is generated by the first motor 11F and the second motor 11R. However, the battery warm-up controller 67 may also carry out the counter-torque driving of the first motor 11F or the second motor 11R when the braking torque of the vehicle 1 is generated by the first motor 11F and the second motor 11R.

In this case, in step S41 in FIG. 7, the battery warm-up controller 67 may calculate the target regenerative torques of the first motor 11F and the second motor 11R in accordance with a requested deceleration rate. Moreover, in step S45 or S49 in FIG. 7, the battery warm-up controller 67 may counter-torque drive the first motor 11F or the second motor 11R to bring a regenerative torque to be generated by the first motor 11F or the second motor 11R to the target regenerative torque. Thus, after the start of travel of the vehicle 1, even when the vehicle 1 decelerates, the heat of the first motor 11F and the second motor 11R is transmitted to the battery 20 through the cooling water circulating in the cooling water circuit 30, causing the battery 20 to be heated, or warmed up.

Back to FIG. 4, after carrying out the warm-up processing before the start of travel or the warm-up processing after the start of travel, the battery warm-up controller 67 may acquire the temperature Tb of the battery 20 and determine whether or not the temperature Tb of the battery 20 has reached a predetermined termination threshold value Tb_1 (step S27). The predetermined termination threshold value Tb_1 may be set to any value to determine whether or not the warming up of the battery 20 has been finished. When the temperature Tb of the battery 20 has not reached the predetermined termination threshold value Tb_1 (S27/No), the battery warm-up controller 67 may cause the flow to return to step S17 and repetitively carry out the processes of the steps described above. When the temperature Tb of the battery 20 has reached the predetermined termination threshold value Tb_1 (S27/Yes), the battery warm-up controller 67 may end the warm-up processing of the battery 20.

As described, the motor control system 10 of this embodiment drives the first inverter circuit 13Fa and the second inverter circuit 13Fb coupled to the first motor 11F, to apply the oppositely directed rotational torques to the rotor 41F of the first motor 11F. The motor control system 10 of this embodiment drives the first inverter circuit 13Ra and the second inverter circuit 13Rb coupled to the second motor 11R, to apply the oppositely directed rotational torques to the rotor 41R of the second motor 11R. This causes the energy loss corresponding to the canceled rotational torques to be consumed as thermal energy, causing the first motor 11F and the second motor 11R to be rapidly heated. Thus, the heat of the first motor 11F and the second motor 11R is transmitted to the battery 20 through the cooling water, causing the battery 20 to be heated. Hence, it is possible to shorten the time it takes to warm up the battery 20.

In the motor control system 10 of this embodiment, the cooling water circuit 30 is also disposed in the first inverter unit 13F and the second inverter unit 13R. Accordingly, the heat generated by the switching elements when driving the first inverter unit 13F and the second inverter unit 13R is also transmitted to the battery 20 through the cooling water. As the canceled rotational torques increase, the number of times the switching elements are driven increase, causing an increase in the heat to be generated by the first inverter unit 13F and the second inverter unit 13R. Hence, it is possible to shorten further the time it takes to warm up of the battery 20.

5. Modification Examples

Although the motor control system of this embodiment has been described in the forgoing, various modification examples may be made to the embodiment described above. Some of the modification examples are described below.

In the forgoing embodiment, the timing of the switchover of which motor to counter-torque drive is determined based on whether or not the temperature of the motor has reached the predetermined reference temperature. However, instead of the temperature of the motor, the timing of the switchover may be determined based on whether or not elapsed time since a start of the counter-torque driving has reached predetermined reference time. For example, which motor to counter-torque drive may be switched every 30 to 120 seconds. The reference time may be set in advance to inhibit the temperature of each motor from becoming higher than the predetermined reference temperature before the end of the warming up of the battery. This makes it possible to warm up the battery by the heat generation of the motor without making each of the motors overheated. Hence, it is possible to shorten the time it takes to warm up the battery.

Moreover, the timing of the switchover of which motor to counter-torque drive is determined based on whether or not the temperature of the motor has reached the predetermined reference temperature. However, instead of the temperature of the motor, the timing of the switchover may be determined based on whether or not an accumulated value of current supply to the motor after the start of the counter-torque driving has reached a predetermined reference value. The reference value of the accumulated value of the current supply may be set in advance to inhibit the temperature of each motor from becoming higher than the predetermined reference temperature before the end of the warming up of the battery. This makes it possible to warm up the battery by the heat generation by the motor without making each motor overheated. Hence, it is possible to shorten the time it takes to warm up the battery.

Furthermore, in the forgoing embodiment, a configuration is adopted in which the cooling water circulating in the cooling water circuit passes through the radiator. However, the cooling water circuit may be configured to make a switchover of a flow path to prevent the cooling water from passing through the radiator.

Figure 8:
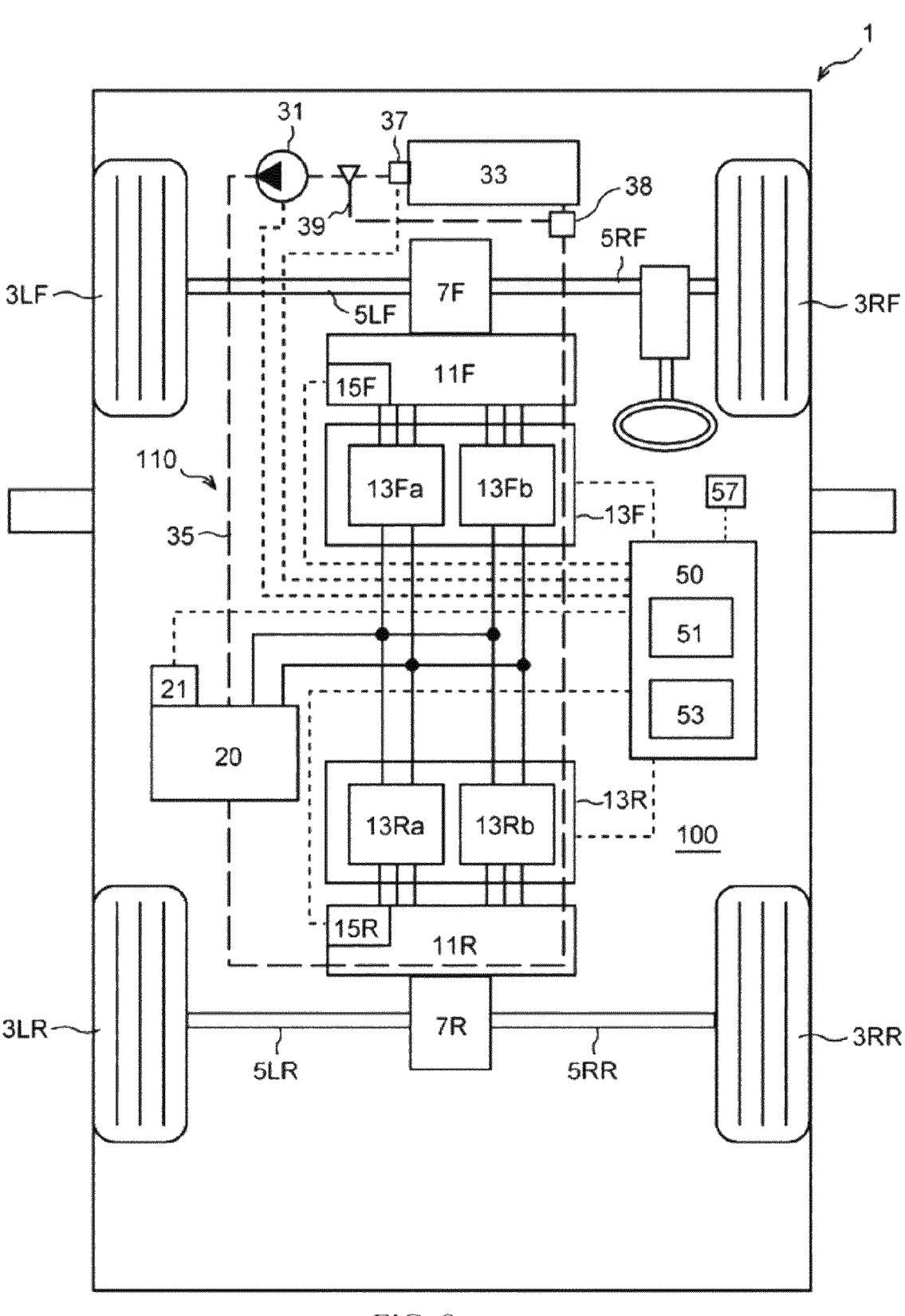
FIG. 8 is a schematic diagram of a configuration example of an electric vehicle including a motor control system according to a modification example of the embodiment.

FIG. 8 illustrates a configuration of a motor control system 100 according to a modification example.

A cooling water circuit 110 of the motor control system 100 may include a bypass passage 39 and a flow path switching device 38. The bypass passage 39 couples the upstream side of the radiator 33 to the downstream side of the radiator 33. The flow path switching device 38 makes a switchover between a first state in which the cooling water passes through the radiator 33 and a second state in which the cooling water passes through the bypass passage 39. The flow path switching device 38 may be driven by the control device 50 to make the switchover between the first state and the second state. The flow path switching device 38 may be, for example, a three-way valve that is driven by energization to switch the flow paths, but may have other configurations. For example, the flow path switching device 38 may be an on-off valve that is provided in the middle of the bypass passage 39, and opens and closes the bypass passage 39.

In the motor control system 100 of the modification example, while carrying out the warm-up processing of the battery 20, the control device 50 may drive the flow path switching device 38 to bring the flow path switching device 38 to the second state in which the cooling water does not pass through the radiator 33. Thus, the cooling water heated passing through the first motor 11F, the second motor 11R, the first inverter unit 13F, and the second inverter unit 13R is supplied to the battery 20 without being cooled by the radiator 33. Hence, it is possible to enhance heating efficiency of the battery 20, and further shorten the time it takes to warm up the battery 20.

Furthermore, in the forgoing embodiment, description is made by giving the example of the four-wheel drive vehicle including the first motor and the second motor that drive the front wheels. However, a drive system of the electric vehicle is not limited to the example described above. For example, the electric vehicle may be a two-wheel drive vehicle including two motors configured to independently drive left and right front wheels or independently drive left and right rear wheels.

In addition, the electric vehicle may be a two-wheel drive vehicle or a four-wheel drive vehicle including one motor that drives the front wheels, the rear wheels, or both. In this case, the control device may warm up the battery while repetitively performing and stopping the counter-torque driving with respect to one motor, making it possible to shorten the time it takes to warm up the battery.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 51 of the control device 50 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 51 of the control device 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 51 of the control device 50 illustrated in FIG. 1.

The invention claimed is:

1. A motor control system to be applied to an electric vehicle, the motor control system comprising:

a battery;

motors each including a rotor and a stator, the motors including a first motor and a second motor;

pairs of two inverter circuits, each pair of two inverter circuits being coupled to the stator of a corresponding one of the motors and configured to control driving and regeneration of the corresponding one of the motors;

a cooling water circuit including a cooling water pump and configured to circulate cooling water through at least the battery and the motors; and one or more processors configured to:

drive the cooling water pump to circulate cooling water;

drive, for one of the first motor and the second motor, a corresponding one of the pairs of two inverter circuits coupled to the stator of the one of the first motor and the second motor to apply oppositely directed rotational torques to the rotor of the one of the first motor and the second motor to warm up the battery with cooling water heated by heat generation of the one of the first motor and the second motor; and while warming up the battery, switch, at predetermined timing, between causing the first motor to generate heat and causing the second motor to generate heat.

2. The motor control system to be applied to the electric vehicle according to claim 1, wherein the one or more processors are configured to make a sum of the oppositely directed rotational torques applied to the rotor of the one of the first motor and the second motor equal to a target output torque of the one of the first motor and the second motor.

3. The motor control system to be applied to the electric vehicle according to claim 1, wherein the one or more processors are configured to, after a start-up of the motor control system and before a start of output of driving torques from the first motor and the second motor, apply the oppositely directed rotational torques of a same magnitude to the rotor of one of the first motor and the second motor, to cause the one of the first motor and the second motor to generate heat while keeping an output torque of the one of the first motor and the second motor equal to zero, to warm up the battery.

4. The motor control system to be applied to the electric vehicle according to claim 1, wherein the cooling water circuit comprises:

a radiator configured to cool cooling water;

a bypass passage coupled between an upstream side and a downstream side of the radiator; and a passage switching device configured to switch between a first state in which cooling water passes through the radiator and a second state in which cooling water passes through the bypass passage, and the one or more processors are configured to warm up the battery while the passage switching device is in the second state.

5. The motor control system to be applied to the electric vehicle according to claim 1, wherein the one or more processors are configured to, when a temperature of the one of the first motor and the second motor that is being caused to generate heat reaches a predetermined reference temperature, stop causing the one of the first motor and the second motor to generate heat, and switch, at the predetermined timing, between causing the first motor to generate heat and causing the second motor to generate heat.

6. The motor control system to be applied to the electric vehicle according to claim 1, wherein the one or more processors are configured to, when elapsed time since a start of application of the oppositely directed rotational torques to the rotor of the one of the first motor and the second motor that is being caused to generate heat reaches predetermined reference time, stop causing the one of the first motor and the second motor to generate heat, and switch, at the predetermined timing, between causing the first motor to generate heat and causing the second motor to generate heat.

7. The motor control system to be applied to the electric vehicle according to claim 1, wherein the one or more processors are configured to, when an amount of current supply to the stator since a start of application of the oppositely directed rotational torques to the rotor of the one of the first motor and the second motor that is being caused to generate heat reaches a predetermined reference value, stop causing the one of the first motor and the second motor to allow to generate heat, and switch, at the predetermined timing, between causing the first motor to generate heat and causing the second motor to generate heat.

8. The motor control system to be applied to the electric vehicle according to claim 1, wherein the one or more processors are configured to, after a start-up of the motor control system and before a start of output of driving torques from the first motor and the second motor, repetitively switch, at predetermined timing, between causing the first motor to generate heat and causing the second motor to generate heat, to alternately raise temperatures of the first motor and the second motor.

9. The motor control system to be applied to the electric vehicle according to claim 1, wherein the one or more processors are configured to cause the first motor and the second motor to generate heat in an order based on distances between the battery and the first motor and between the battery and the second motor along a direction of circulation of cooling water in the cooling water circuit, such that a motor closer to the battery on an upstream side in the direction of circulation is caused to generate heat before a motor farther from the battery.

10. The motor control system to be applied to the electric vehicle according to claim 1, wherein the one or more processors are configured to cause the first motor and the second motor to generate heat in an order based on rated output torques of the first motor and the second motor, such that a motor having a higher rated output torque is caused to generate heat before a motor having a lower rated output torque.

11. The motor control system to be applied to the electric vehicle according to claim 1, wherein the one or more processors are configured to, when a temperature of cooling water circulating in the cooling water circuit reaches a predetermined upper limit threshold value, stop driving the corresponding one of the pairs of two inverter circuits to stop applying the oppositely directed rotational torques to the rotor.

12. An electric vehicle including a motor control system, the motor control system comprising:

a battery;

motors each including a rotor and a stator, the motors including a first motor and a second motor;

pairs of two inverter circuits, each pair of two inverter circuits being coupled to the stator of a corresponding one of the motors and configured to control driving and regeneration of the corresponding one of the motors;

a cooling water circuit including a cooling water pump and configured to circulate cooling water through at least the battery and the motors; and one or more processors configured to;

drive the cooling water pump to circulate cooling water;

drive, for one of the first motor and the second motor, a corresponding one of the pairs of two inverter circuits coupled to the stator of the one of the first motor and the second motor to apply oppositely directed rotational torques to the rotor of the one of the first motor and the second motor to warm up the battery with cooling water heated by heat generation of the one of the first motor and the second motor; and while warming up the battery, switch, at predetermined timing, between causing the first motor to generate heat and causing the second motor to generate heat.

* * * * *